April 4, 1950     H. J. GARCEAU     2,502,838
AUTOMOBILE AWNING
Filed March 22, 1946     3 Sheets-Sheet 2
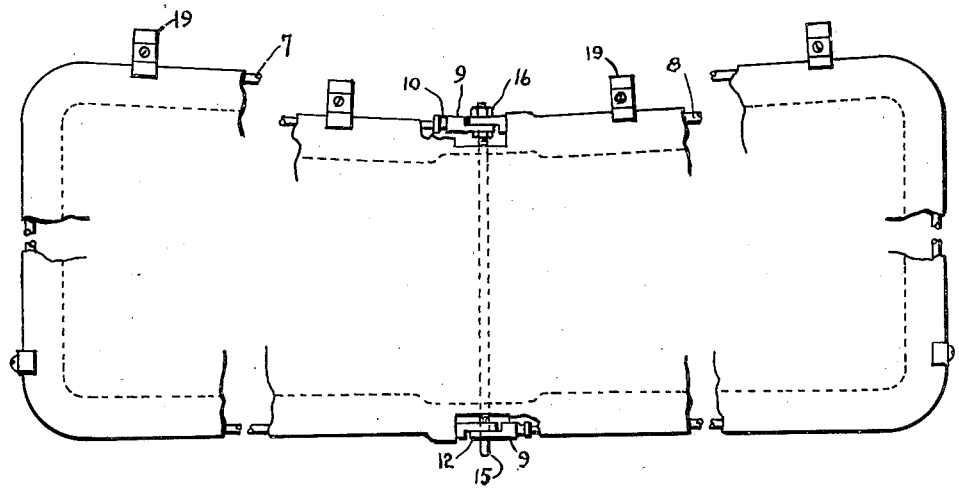
FIG. 3
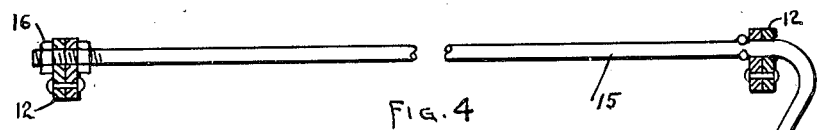
FIG. 4
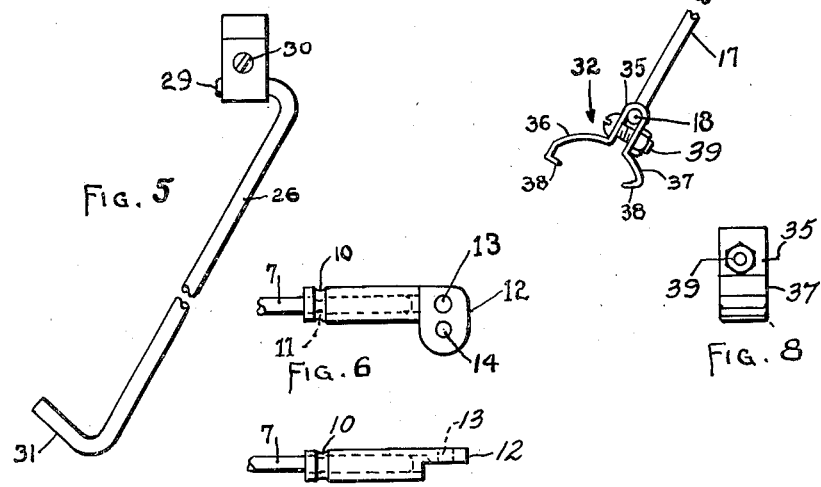
INVENTOR.
HARRY J. GARCEAU.
BY
Atty.

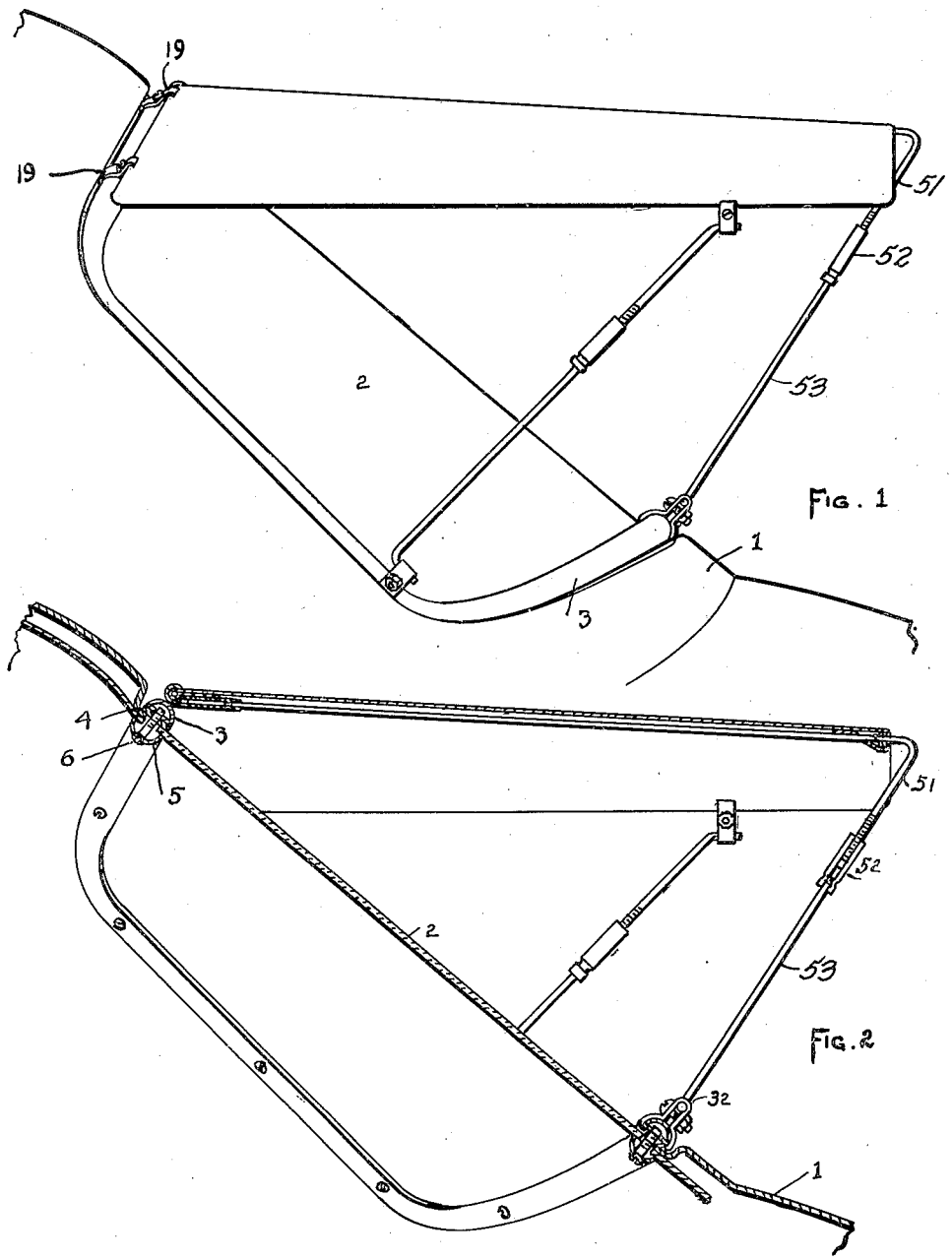

April 4, 1950 H. J. GARCEAU 2,502,838
AUTOMOBILE AWNING
Filed March 22, 1946 3 Sheets-Sheet 3
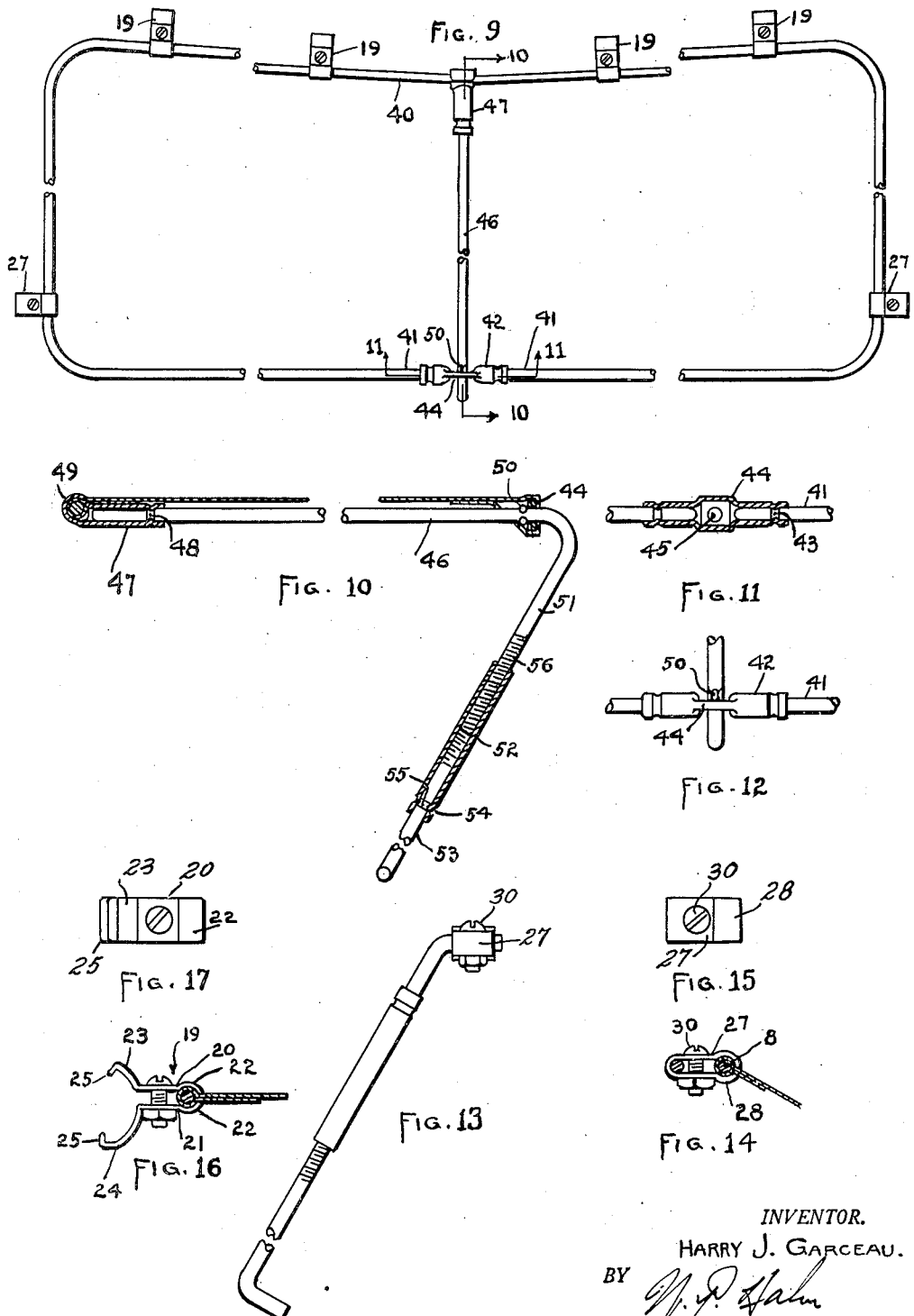
INVENTOR.
HARRY J. GARCEAU.
BY
Atty.

Patented Apr. 4, 1950

2,502,838

UNITED STATES PATENT OFFICE 2,502,838

AUTOMOBILE AWNING

Harry J. Garceau, Muncie, Ind.

Application March 22, 1946, Serial No. 656,272

8 Claims. (Cl. 160—48)

The present invention relates to improvements in sunshade devices for automobiles and like vehicles.

It has for one of its objects the provision of an awning or sunshade for preventing the entry of sun rays into the rear window of an automobile.

Another object of the invention is to provide an awning device which may readily be attached to the rear window of the present type of automobiles, without in any way modifying the automobile structure.

A still further object of the invention is to provide a readily attachable and detachable awning structure for the rear window of an automobile which is so arranged that it will not interfere with the vision of the driver through the rear window of the automobile.

Another object of the invention is to provide an awning structure which while permitting a clear view through the window of an automobile and while preventing the entry of the sun rays through the rear window of the automobile will also prevent the rear window from being obscured by rain and which will prevent the accumulation of snow or ice on the rear window in bad weather.

There have commercially been produced certain types of window curtains for shutting out the sun in the windows of an automobile and there have been a number of commercial attempts to provide shades or screens of one kind or another for accomplishing this purpose with respect to the rear window.

One of the objections to the devices heretofore commercially used has been that they do not prevent the sun rays from falling upon the rear window, but are adapted to block the sun rays after passing through the window. As a result, the window acts more or less as a sun glass and increases the heat within the body of the car and also the curtains or screens themselves become heated, increasing the heat of the body of the car. Furthermore, such types of screens or window shades block the view, through the rear window, of the driver.

By the use of my invention, the sun rays are prevented from even falling on the rear window so that the body of the car is kept comparatively cool and, at the same time there is no interference with the view of the driver through the rear window.

For the purpose of illustrating my invention, I have shown certain embodiments thereof in the accompanying drawings, in which:

Fig. 1 is a partial side elevation of the rear of a car showing my awning attached;

Fig. 2 is a longitudinal sectional view of the structure illustrated in Fig. 1;

Fig. 3 is a plan view of my awning structure;

Fig. 4 is a side elevation, showing the awning structure in section, of the center brace of the awning structure shown in Fig. 3;

Fig. 5 is a side elevation of one type of side braces for the structure illustrated in Fig. 3;

Figs. 6 and 7 are respectively a side elevation and top plan of one of the hinge members of the structure as illustrated in Fig. 3;

Fig. 8 is a side view of the clamp shown in Fig. 4 rotated approximately 90° clockwise;

Fig. 9 is a plan view of a modified frame of my awning structure;

Fig. 10 is a sectional view on the line 10—10 of Fig. 9 and showing a modification of the brace shown in Fig. 4;

Fig. 11 is a detail section of the joint for the free ends of the frame shown in Fig. 9;

Fig. 12 is a detail of the connection between the center brace and the frame structure illustrated in Fig. 9;

Fig. 13 is a side elevation of one of the side braces for the structure shown in Fig. 9;

Fig. 14 is a detail section of the clamp member for the upper end of the structure shown in Fig. 13;

Fig. 15 is a plan view of the clamp member shown in Fig. 14;

Fig. 16 is a side elevation of a modified form of clamp member for securing the awning frame in position; and Fig. 17 is a plan view of the structure illustrated in Fig. 16.

In the structure illustrated, the rear end 1 of an automobile of the standard commercial type is provided with a glass rear window 2. This window is clamped in position by a clamping bead 3 which surrounds the periphery of the glass and engages the edge 4 of the opening in the body. Suitable clamping members 5, through which clamping screws 6 pass, hold this bead in position.

The awning itself is adapted to be secured to this bead and the awning comprises, in the structure illustrated in Fig. 3, a wire frame comprising two U-shaped sections 7 and 8. The abutting ends of the sections are each provided with a hinge member comprising a tubular portion 9 adapted to receive the end of the wire frame and be secured on the end frame by spinning a portion 10 into a groove 11 on the frame itself. This tubular portion has a flattened hinge section 12 provided with an opening 13 and a second off-center opening 14.

The hinges are adapted to be pivotally secured together through the medium of the horizontal arm 15 of a center brace for the awning. This horizontal arm passes through the coinciding openings 13 in the hinge portions 12 and at one end is prevented from removal by a suitable nut 16. The rear end of the horizontal arm 15 is downturned and inclined inwardly as at 17, and is provided at its end with a transverse lug 18. Due to the downturned portion 17, longitudinal movement of the arm 15 is prevented. After the hinges of the two frame sections 7 and 8 have been connected through the medium of the horizontal arm 15, the frame sections may be locked in open position by locking pins passing through the coinciding openings 14 of the hinges.

A suitable cover or awning is secured over the frame constructed as above, which awning may be formed of suitable awning material such as canvas or the like. The edges of the awning are turned over the frame and then stitched to form a hem receiving the frame.

The front edge of the awning is secured to the top run of the bead 3 through the medium of suitable clamps 19, Figs. 16 and 17. These clamps each comprise a pair of arms 20 and 21 having curved pockets 22 for receiving the wire frame of the awning and their opposite ends are provided with jaws 23 and 24, each having inturned fingers 25. The jaw 23 is considerably shorter than the jaw 24 and in securing the front edge of the awning to the upper run of the bead 3, the two clamping members 19 towards the center of the frame are secured in position with the jaws 23 uppermost, while the two outer clamping members are reversed in position so that the jaw 24 is uppermost, thereby compensating for the curve of the top run of the bead, so that the edge of the awning will be maintained closely adjacent the body of the car.

The rear portion of the owning is not only supported by the brace such as 17, but is also supported by a pair of side braces such as 26. To secure the side braces at the rear of the frame, I provide clamping members such as are shown in Figs. 14 and 15. It is to be noted that these clamping members comprise a U-shaped clamp 27 the jaws 28 of which are provided with socket sections to receive the wire frame 7 or 8, and provided at their rear is a loop into which may be secured a horizontally turned end 29 of the brace 26. A suitable bolt 30 clamps the parts together so that, after having once been assembled, they will remain in position. The lower end of the brace 26 is provided with a substantially horizontal portion 31 which is secured in position by a clamping member 32 similar to that illustrated in Fig. 4. This clamping member is provided with a U-shaped loop 35 having a pair of jaws 36 and 37 with inturned fingers 38. The bottom, horizontal portions of the braces are adapted to be received in the loop portion 35 while the jaws 36 and 37 are clamped on the bead 3 of the window, suitable clamping bolts 39 being provided for drawing the jaws tight.

It is obvious that if desired, the clamping members shown in Fig. 4 may be used in place of the clamping member shown in Figs. 16 and 18 or vice versa.

In Fig. 9, I have shown a modified form of awning frame. In this structure, the wire frame 40 is formed of a single piece of wire bent into substantially rectangular form with two abutting ends 41. These ends are fastened into a tubular fastener 42 which has internal beads spun into grooves 43 in the ends of the wire to secure the two ends together. The center portion of this tubular fastener is flattened as at 44 and provided with a center opening 45. Through this center opening passes a horizontal center brace arm 46, the front end of which is provided with a fastener having a tubular portion 47 provided with an internal bead taking into a groove 48 in the arm 46 and this tubular portion is provided with a flattened curved lip 49 which takes over the front run of the frame 40. The horizontal arm 46 is held against longitudinal displacement by struck up portions 50. The vertical leg 51 of the brace is preferably made adjustable as to length and to this end, I provide a tubular coupling 52 swivelled on the bottom section 53 of the leg 51 by means of an internal bead 54 taking into a groove 55 and internally screw threaded to receive the screw thread end 56 of the arm 51. The lower end of this brace is secured in position by means of a clamp such as is illustrated in Fig. 4 or by means of the clamp illustrated in Figs. 16 and 17. The rear side ends of the frame are braced by braces similar to those illustrated in Fig. 13, which are likewise made adjustable by the same kind of coupling as that illustrated in Fig. 10. It is to be observed that the braces illustrated in Figs. 4 and 5 may likewise be made adjustable as to the length desired.

I claim as my invention:

1. An awning structure for attachment to the window of an automobile, which window is provided with an exteriorly mounted securing molding for maintaining the window in position, said awning structure comprising a substantially rectangular frame, a fabric awning secured to said frame, one edge of said frame being provided with clamping members having jaws adapted to engage and be secured to the upper run of said molding and supporting means for supporting the opposite edge of said frame comprising a plurality of downwardly extending legs secured to said frame and terminating in clamping jaws clamped to the lower portion of said molding.

2. An awning structure for attachment to the window of an automobile, which window is provided with an exteriorly mounted securing molding for maintaining the window in position, said awning structure comprising a substantially rectangular frame and a fabric awning secured to said frame, one edge of said frame being provided with clamping members having jaws clamping upon the upper run of said molding and supporting means for supporting the opposite edge of said frame comprising downwardly extending legs secured to said frame, pairs of clamping jaws clamping upon the lower portion of said molding and means for detachably connecting the bottom terminal of said supporting legs severally to said pairs of jaws.

3. An awning structure for attachment to the window of an automobile, which window is provided with an exteriorly mounted securing molding for maintaining the window in position, said awning structure comprising a substantially rectangular frame and supporting an awning, a plurality of pairs of clamping jaws for supporting the one end of said frame from said molding, each pair of jaws comprising a U-shaped loop terminating in diverging jaws, the base of said U-shaped loop embracing the frame and a clamping member extending through the shank of the loop to compress the jaws upon the upper run of the molding of the window, a plurality of supporting legs for supporting the opposite end of said frame, means for securing the upper ends of said legs at the rear of said frame, pairs of clamping jaws each comprising a U-shaped loop having spreading clamping jaws adapted to engage the bottom run of said molding and a clamping member extending through the shank of said loop to compress the jaws upon said molding, said supporting legs having means engaging in the base of the U-shaped loop of associated clamping jaws and means for simultaneously contracting the jaws upon the molding and contracting the loop upon the engaging means of the leg.

4. An awning structure for attachment to the window of an automobile, which window is provided with an exteriorly mounted securing molding for maintaining the window in position, said structure comprising a substantially rectangular frame, a fabric awning secured to said frame, means for securing one edge of said frame to the molding of said window comprising clamping means connected to the frame and provided with clamping jaws engageable with and clamped upon the upper run of said molding and means for supporting the opposite edge of said frame comprising downwardly extending longitudinal adjustable legs secured at the rear end of said frame and having means at the lower end clamping upon the lower portion of said molding.

5. An awning structure for attachment to the window of an automobile, which window is provided with an exteriorly mounted securing molding for maintaining the window in position, said awning structure comprising a pair of substantially rectangular open-ended sections, means for hingedly securing the ends of said sections together to facilitate folding of the frame, a fabric awning cover supported by said frame, means secured to one end of said frame for connecting said edge to the upper run of the window molding comprising a plurality of clamping jaws secured to the front edge of said frame and engageable with and adapted to be clamped upon the upper edge of said molding and means for supporting the rear ends of said sections comprising a plurality of downwardly extending legs secured to the rear end of said each section and terminating in clamping jaws clamped upon said molding at the bottom of said window.

6. An awning structure for attachment to the window of an automobile, which window is provided with an exteriorly mounted securing molding for maintaining the window in position, said awning structure comprising a frame formed of two open-ended substantially rectangular sections in facing relation, hinge members secured to the adjacent ends of the two sections, a pair of each of said hinge members having aligning openings, a supporting leg, means for securing one end of said frame to the upper run of the molding of the window comprising clamping jaws secured to the frame and engaging and clamping the upper run of said molding, a supporting leg for the rear end of said frame comprising a substantially horizontal member adapted to pass through the aligning openings of the hinge members to provide a hinge pin for said hinge members and a downwardly extending portion terminating in clamping means clamping the bottom run of said molding and means for supporting the outer ends of said frame comprising downwardly extending legs secured adjacent the rear portion of said frame and terminating at their lower ends in clamping members clamped upon said molding near the lower portion of the window.

7. An awning structure for attachment to the rear window of an automobile, which window is provided with an exteriorly mounted securing molding for maintaining the window in position, said awning structure comprising a substantially rectangular frame and supporting an awning, a plurality of pairs of clamping jaws for supporting one end of said frame on said molding, each pair of jaws comprising a rearwardly extending shank embracing at its rear end, the frame and a jaw member angularly inclined relatively to the shank and clamping bolts extending through the shank portions of the pairs of jaws for clamping the jaws upon the molding, and means for supporting the rear edge of said frame comprising a plurality of downwardly extending legs secured to said frame and terminating in clamping jaws adapted to be engaged and clamped to the bottom run of the window molding.

8. An awning structure for attachment to the rear window of an automobile, which window is provided with an exteriorly mounted securing molding for maintaining the window in position, said awning structure comprising a substantially rectangular frame and supporting an awning, a plurality of pairs of clamping jaws for supporting one end of said frame from said molding, each pair of jaws comprising a shank embracing at its rear end the frame and provided at its front end with a forwardly and upwardly inclined jaw, the jaws of one of the pairs being longer than the jaws of the other of the pair, and clamping bolts extending through the shanks of the jaws for maintaining the jaws in clamped position on the molding and means for supporting the opposite edge of said frame comprising a plurality of downwardly extending legs secured to said frame and terminating in clamping jaws clamped to the bottom run of said molding.

HARRY J. GARCEAU.

REFERENCES CITED

The following references are of record in the file of this patent:

UNITED STATES PATENTS

| Number | Name | Date |
|---|---|---|
| 2,180,909 | Peckat | Nov. 21, 1939 |
| 2,253,353 | Sharp | Aug. 19, 1941 |
| 2,334,856 | Atkinson | Nov. 23, 1943 |
| 2,389,002 | Schatzman | Nov. 13, 1945 |